(12) United States Patent
Matsushita (10) Patent No.: US 11,034,899 B2
(45) Date of Patent: Jun. 15, 2021

(54) GASIFICATION FURNACE

(71) Applicants: Yasuharu Matsushita, Toyama (JP); Kohei Matsushita, Tokyo (JP); Kodai Matsushita, Toyama (JP); ZE Energy Inc., Tokyo (JP)

(72) Inventor: Yasuharu Matsushita, Toyama (JP)

(73) Assignees: Yasuharu Matsushita, Toyama (JP); Kohei Matsushita, Tokyo (JP); Kodai Matsushita, Toyama (JP); ZE Energy Inc., Tokyo (JP)

(*) Notice: Subject to any disclaimer, the term of this patent is extended or adjusted under 35 U.S.C. 154(b) by 198 days.

(21) Appl. No.: 16/066,842

(22) PCT Filed: Dec. 27, 2016

(86) PCT No.: PCT/JP2016/088980
§ 371 (c)(1),
(2) Date: Jun. 28, 2018

(87) PCT Pub. No.: WO2017/115817
PCT Pub. Date: Jul. 6, 2017

(65) Prior Publication Data
US 2019/0002776 A1    Jan. 3, 2019

(30) Foreign Application Priority Data
Dec. 28, 2015  (JP) .............................. JP2015-256966

(51) Int. Cl.
*C10J 3/38*   (2006.01)
*C10J 3/32*   (2006.01)
(Continued)

(52) U.S. Cl.
CPC .  *C10J 3/38* (2013.01); *C10J 3/02* (2013.01); *C10J 3/32* (2013.01); *C10J 3/76* (2013.01);
(Continued)

(58) Field of Classification Search
CPC ......... C10J 3/38; C10J 3/32; C10J 3/34; C10J 3/36; C10J 3/40; C10J 3/42; C10J 2200/152; B09B 3/00
See application file for complete search history.

(56) References Cited

U.S. PATENT DOCUMENTS 1,857,355 A * 5/1932 Chapman .................... C10J 3/34
                                                              48/85.2
1,911,586 A * 5/1933 Schneider et al. ......... C10J 3/38
                                                              48/85.2
(Continued)

FOREIGN PATENT DOCUMENTS

CN    102191089 A    9/2011
CN    102863990 A    1/2013
(Continued)

OTHER PUBLICATIONS

International Search Report and Written Opinion for International Application No. PCT/JP2016/088980 dated Jan. 31, 2017.
(Continued)

*Primary Examiner* — Matthew J Merkling
(74) *Attorney, Agent, or Firm* — Alston & Bird LLP (57) ABSTRACT

Provided is a gasification furnace that can efficiently gasify a biomass resource. The gasification furnace may include a furnace body including a cylindrical storing unit that may store a biomass resource, an oxidizer supplying unit that may supply an oxidizer into the furnace body, a shaft extended in a vertical direction in the storing unit and including an oxidizer supply path through which the oxidizer may be passed, an oxidizer supply tube that may include an oxidizer channel that communicates between a supply port for the oxidizer opened in an outer surface in contact with the biomass resource in the storing unit and the oxidizer supply path of the shaft, and a driving unit that may
(Continued)

rotate the shaft with the vertical direction in the storing unit set as a rotation axis to thereby turn the oxidizer supply tube in the storing unit.

8 Claims, 11 Drawing Sheets

(51) Int. Cl.
*C10J 3/02* (2006.01)
*C10J 3/76* (2006.01)
*B09B 3/00* (2006.01)
*F23G 5/24* (2006.01)

(52) U.S. Cl.
CPC ........... *B09B 3/00* (2013.01); *C10J 2200/152* (2013.01); *C10J 2300/0916* (2013.01); *C10J 2300/0959* (2013.01); *C10J 2300/1892* (2013.01); *F23G 5/24* (2013.01)

(56) References Cited

U.S. PATENT DOCUMENTS

| | | | | |
|---|---|---|---|---|
| 2,147,324 A * | 2/1939 | Van Ackeren | ............. | C10J 3/38 110/229 |
| 2,689,786 A * | 9/1954 | Hubmann | ................ | C10J 1/207 48/198.2 |
| 3,454,382 A * | 7/1969 | Hamilton | ................... | C10J 3/20 48/76 |
| 4,011,059 A | 3/1977 | Daly et al. | | |
| 4,137,051 A | 1/1979 | Godwin | | |
| 4,225,392 A * | 9/1980 | Taylor | ...................... | C10B 1/04 202/120 |
| 4,659,340 A * | 4/1987 | Weaver | ...................... | C10J 3/26 110/229 |
| 4,929,254 A * | 5/1990 | Kooiman | ................... | C10J 3/26 48/111 |
| 7,964,026 B2 * | 6/2011 | Rogers | ................... | B01D 53/14 110/204 |
| 8,961,626 B1 * | 2/2015 | Thiessen | ............... | F23G 5/0276 48/61 |
| 2002/0159929 A1 | 10/2002 | Kaneko et al. | | |
| 2008/0024323 A1 | 1/2008 | Kadaba | | |
| 2010/0107493 A1 * | 5/2010 | Weaver | ...................... | C10J 3/42 48/86 R |
| 2017/0073593 A1 * | 3/2017 | Appel | ........................ | F23J 1/06 |

FOREIGN PATENT DOCUMENTS

| | | |
|---|---|---|
| EP | 0101143 A2 | 2/1984 |
| EP | 2752478 A1 | 7/2014 |
| JP | S 54-107905 A | 8/1979 |
| JP | S5827311 | 6/1983 |
| JP | S 63-167148 U | 7/1988 |
| JP | H10221223 A | 8/1998 |
| JP | 2003-238972 | 8/2003 |
| JP | 2004-51647 | 2/2004 |
| JP | 2005-146188 | 6/2005 |
| JP | 2009-263428 | 11/2009 |
| JP | 2010-013583 | 1/2010 |
| JP | 2011-236260 | 11/2011 |
| JP | 2013-213647 | 10/2013 |
| JP | 58-27311 | 12/2015 |
| NL | 8200417 A | 9/1983 |

OTHER PUBLICATIONS

Extended European Search Report for Application No. 16881791.4, dated May 5, 2019, 8 pages.
Office Action for Japanese Application No. 2015-256966 (Notice of Reasons for Refusal) dated Dec. 3, 2019.
Office Action for Indian Patent Application No. 201817028217 dated Feb. 27, 2020, 6 pages.
Office Action for Chinese Application No. 201680076812.1 dated Jul. 17, 2020.

* cited by examiner

GASIFICATION FURNACE

CROSS-REFERENCE TO RELATED APPLICATIONS

This application is a national stage application filed under 35 U.S.C. § 371 of International Application No. PCT/JP2016/088980 filed Dec. 27, 2016, which application is based upon and claims priority to Japanese Patent Application No. 2015-256966 filed on Dec. 28, 2015, which applications are hereby incorporated by reference herein in their entireties.

FIELD

The present invention relates to a gasification furnace and a gasification system for gasifying a biomass resource.

BACKGROUND

In recent years, gasifying a biomass resource (a resource derived from organisms such as debris of a construction waste material) and using the biomass resource as fuel and the like has been actively performed. For example, the biomass resource is fed into a gasification furnace and ignited. The biomass resource is dry-distilled by heat of the ignition. Organic matter is thermally decomposed and gasified to generate gas for fuel including $H_2$, $CH_4$, and CO.

SUMMARY

Technical Problem

When the biomass resource is gasified, combustion progresses if oxygen is sufficiently present in the gasification furnace. Even thermally decomposed gas is burned and the gas for fuel cannot be produced. Therefore, an amount of an oxidizer such as the air supplied into the gasification furnace is limited to a degree for keeping temperature necessary for the thermal decomposition of the biomass resource.

As a configuration for supplying the oxidizer, there are known a configuration in which the oxidizer is supplied from a supply port provided in an inner wall of the gasification furnace storing the biomass resource and a configuration in which a rotating shaft, on the periphery of which an agitating member is provided, is provided in the gasification furnace and the oxidizer is supplied from the distal end (the lower end) of the rotating shaft (Japanese Patent Application Laid-Open No. 2005-146188).

In the configurations set as supplying units of the oxidizer from the inner wall of the gasification furnace and the distal end of the rotating shaft in this way, there is a problem in that reaction of the oxidizer and the biomass resource is limited to the peripheries of the supplying units and efficiency is low.

Therefore, an object of the present invention is to provide a gasification furnace that can efficiently gasify a biomass resource.

Solution to Problem

To solve the problem, a gasification furnace of the present invention includes: a furnace body including a cylindrical storing unit that stores a biomass resource; an oxidizer supplying unit that supplies an oxidizer into the furnace body; a shaft extended in a vertical direction in the storing unit and including an oxidizer supply path through which the oxidizer is passed; an oxidizer supply tube, which is a tubular member projecting from the shaft toward an inner wall of the storing unit, the oxidizer supply tube including an oxidizer channel that communicates between a supply port for the oxidizer opened in an outer surface in contact with the biomass resource in the storing unit and the oxidizer supply path of the shaft; and a driving unit that rotates the shaft with the vertical direction in the storing unit set as a rotation axis to thereby turn the oxidizer supply tube in the storing unit.

In the gasification furnace, the shaft may include a channel of a refrigerant, and the oxidizer supply tube may include a channel of the refrigerant that communicates with the channel on the shaft side.

The gasification furnace may include an upper scraper that projects from the shaft toward the inner wall of the storing unit at a height adjusted to a target in a case in which the biomass resource is fed from an upper part of the storing unit and deposited to a height of the target.

The gasification furnace may include a partitioning unit that vertically partitions the storing unit and includes a plurality of openings piercing through the storing unit in an up-down direction and may include a lower scraper that projects from the shaft toward the inner wall of the storing unit in a state in which the lower scraper is in contact with an upper surface of the partitioning unit or a state in which the lower scraper is contiguous to the upper surface.

The gasification furnace may include a partitioning unit that vertically partitions the storing unit and includes a plurality of holes piercing through the storing unit in an up-down direction, the storing unit above the partitioning unit may be set as a first gasification chamber, and the gasification furnace may include a second gasification chamber in the storing unit below the partitioning unit.

In the gasification furnace, the shaft and the oxidizer supply tube may be provided in each of the first gasification chamber and the second gasification chamber.

In the gasification furnace, the shaft may be provided across the first gasification chamber and the second gasification chamber, the oxidizer supply tube may be provided in each of the first gasification chamber and the second gasification chamber.

In the gasification furnace, the shaft may include a first oxidizer supply path for supplying the oxidizer from an upper part to the oxidizer supply tube in the first gasification chamber and a second oxidizer supply path for supplying the oxidizer from a lower part to the oxidizer supply tube in the second gasification chamber.

The gasification furnace may include a lower scraper that projects from the shaft toward the inner wall of the storing unit in a state in which the lower scraper is in contact with an upper surface of the partitioning unit or a state in which the lower scraper is contiguous to the upper surface.

Advantageous Effect

According to the present invention, it is possible to provide a gasification furnace that can efficiently gasify a biomass resource.

DETAILED DESCRIPTION

First Embodiment

Embodiments of the present invention are explained in detail below with reference to the drawings. First, an overview of a gasification furnace according to a first embodiment of the present invention is explained with reference to FIG. 1.

Overall Configuration

Figure 1:
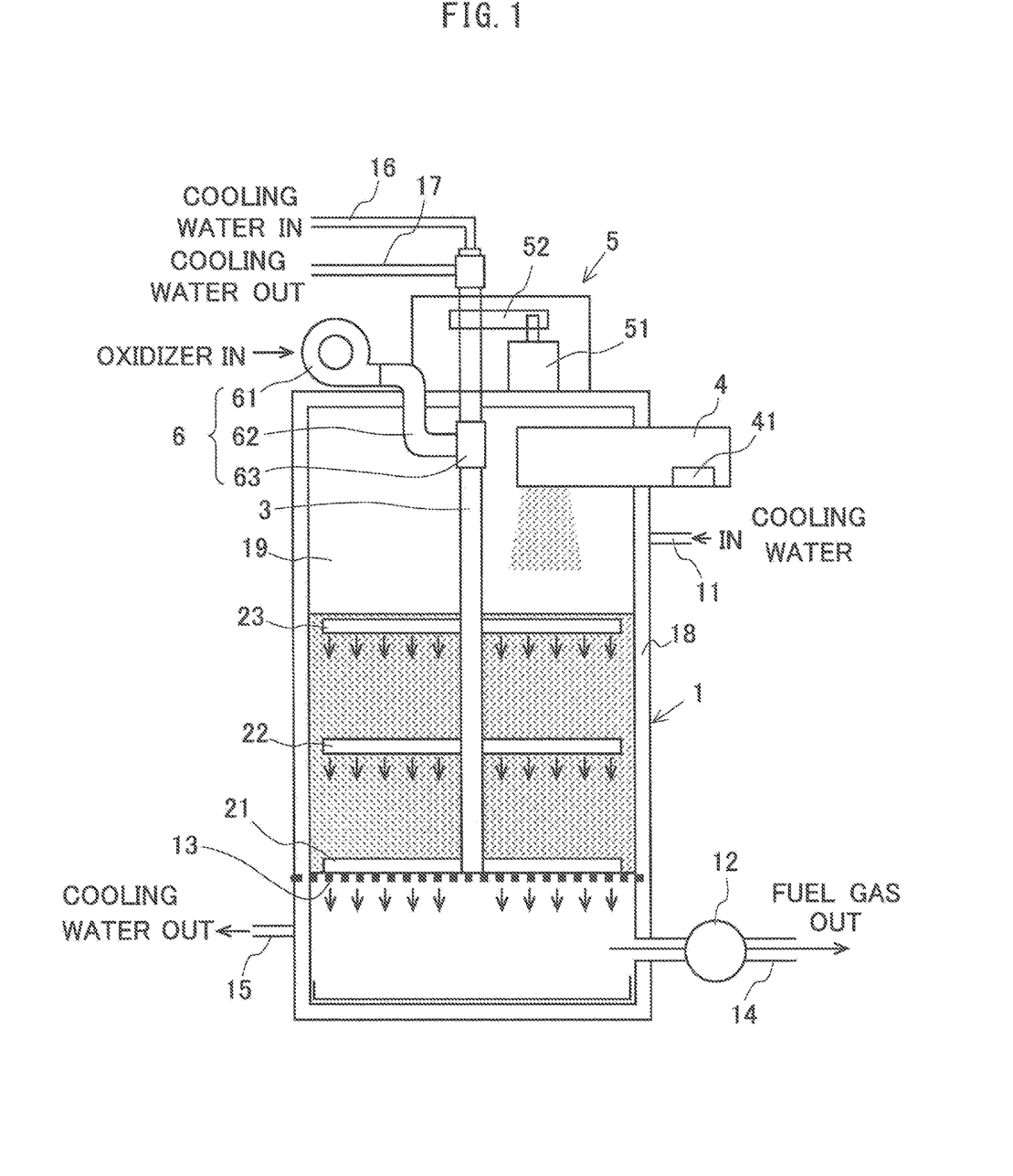
FIG. 1 is an explanatory diagram of a gasification furnace according to a first embodiment.

The gasification furnace according to the first embodiment is a unit for using a biomass resource as a raw material and dry-distilling and gasifying the raw material. The gasification furnace includes a furnace body 1, a shaft 3, a raw-material feeding unit 4, a driving unit 5, an oxidizer supplying unit 6, a punching plate 13, a lower scraper 21, an oxidizer supply tube 22, an upper scraper 23, and a blower 12.

The furnace body 1 includes a cylindrical storing unit 19 that stores the raw material on the inside and includes a water cooling jacket 18 between an outer wall and an inner wall. The water cooling jacket 18 introduces, as refrigerant, cooling water from a refrigerant introducing unit 11 provided in an upper part, circulates the cooling water in a wall of the furnace body 1 to cool the furnace body, and discharges the refrigerant after the cooling from a refrigerant discharging unit 15.

The shaft 3 is extended in the vertical direction in the storing unit 19 and includes an oxidizer supply path through which an oxidizer is passed as explained below.

The raw-material feeding unit 4 is a device that feeds a raw material such as chips or pellets into the storing unit 19 in the furnace body 1. The raw-material feeding unit 4 feeds a raw material supplied from a supply system such as a chain conveyor, a bucket elevator, or a screw conveyor not illustrated in the figure into the storing unit 19 with, for example, a screw feeder. The raw-material feeding unit 4 includes an electric heater 41 that ignites the raw material.

The driving unit 5 includes an electric motor 51 functioning as a driving source and a coupling mechanism 52 such as a gear that transmits a driving force of the electric motor 51 to the shaft 3. The driving unit 5 drives to rotate the shaft 3 with the vertical direction set as a rotation axis.

The oxidizer supplying unit 6 includes a blower 61, a duct 62, and a connecting unit 63. The connecting unit 63 communicates with an oxidizer supply path of the shaft 3 explained below. The oxidizer supplying unit 6 blows the air serving as an oxidizer with the blower 61 and supplies the oxidizer into the storing unit 19 via the duct 62, the connecting unit 63, and the shaft 3.

The punching plate 13 is a partitioning unit that vertically partitions the storing unit 19 and includes a plurality of openings piercing through the storing unit 19 in an up-down direction. The punching plate 13 has a configuration in which the size of the openings is set smaller than the size of the raw material at the feeding time such that the raw material fed into the storing unit 19 can be stacked and the raw material carbonized to be fine grans is dropped. The punching plate 13 of the first embodiment is a so-called punching metal. However, the punching plate 13 is not limited to this and may be a mesh or a lattice.

The lower scraper 21 has a configuration in which the lower scraper 21 projects in the horizontal direction from the shaft 3 toward the inner wall of the storing unit 19 in a state in which the lower scraper 21 is in contact with the upper surface of the punching plate 13 or a state in which the lower scraper 21 is contiguous to the upper surface. Note that the contiguous state in which the lower scraper 21 is contiguous to the upper surface is a state in which the lower scraper 21 is close to the upper surface such that a gap between the lower end of the lower scraper 21 and the punching plate 13 is close to the size of the raw material or smaller than the size of the raw material to make it possible to move the raw material on the punching plate 13.

The oxidizer supply tube 22 is a tubular member horizontally projecting from the shaft 3 toward the inner wall of the storing unit 19. The oxidizer supply tube 22 includes an oxidizer channel that communicates between a supply port for the oxidizer opened in an outer surface in contact with the raw material in the storing unit and the oxidizer supply path of the shaft.

The upper scraper 23 has a configuration in which the upper scraper 23 horizontally projects from the shaft 3 toward the inner wall of the storing unit 19 at a height adjusted to a target in the case in which the raw material is fed from an upper part of the storing unit 19 and deposited to the height of the target.

An intake side of the blower 12 is connected to a space below the punching plate 13 of the storing unit 19. The blower 12 sucks out a fuel gas gasified in the storing unit 19 and delivers the fuel gas to a demand side such as a gas turbine via a pipe 14.

In this way, the gasification furnace feeds the raw material into the storing unit 19 with the raw-material feeding unit 4, deposits the raw material on the punching plate 13, dry-distills the raw material in a state in which the oxidizer supply tube 22 is horizontally turned in the storing unit 19 by driving to rotate the shaft 3, gasifies organic matter to produce a fuel gas, and delivers the fuel gas to the demand side. At this time, the gasification furnace of the first embodiment supplies the oxidizer while turning the oxidizer supply tube 22 in the horizontal direction in the storing unit 19. Therefore, reaction can be caused in a wide range in the horizontal direction in the storing unit 19. Thermal decomposition involved in the reaction also occurs in a wide range. Therefore, gasification can be efficiently performed.

Configurations of the Units

Figure 2A:
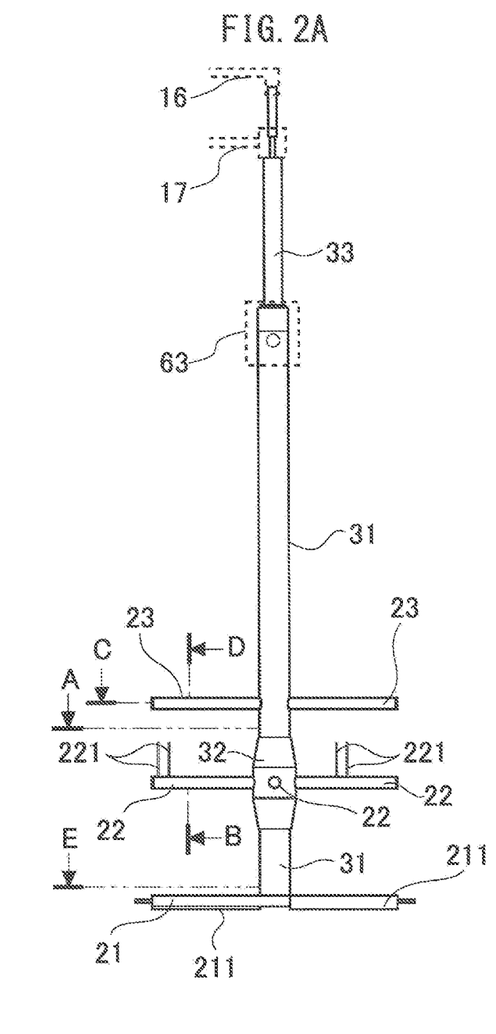
FIGS. 2A to 2C are diagrams illustrating the configuration of a shaft.
Figure 2B:
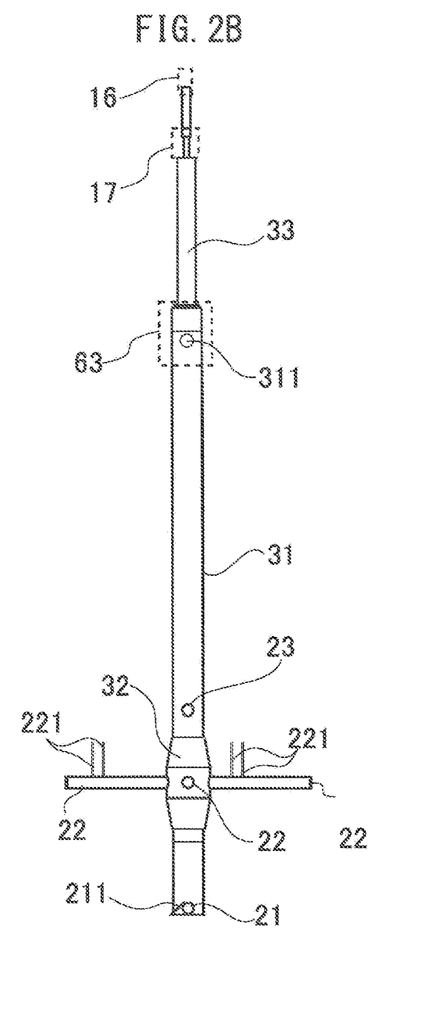
Figure 2C:
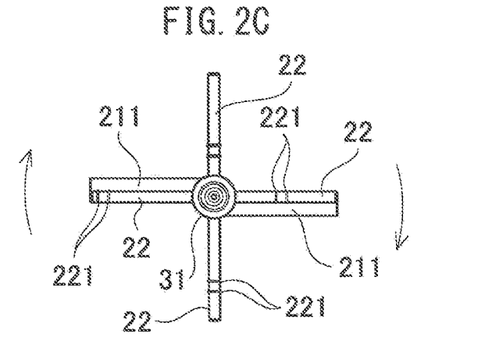
Figure 3:
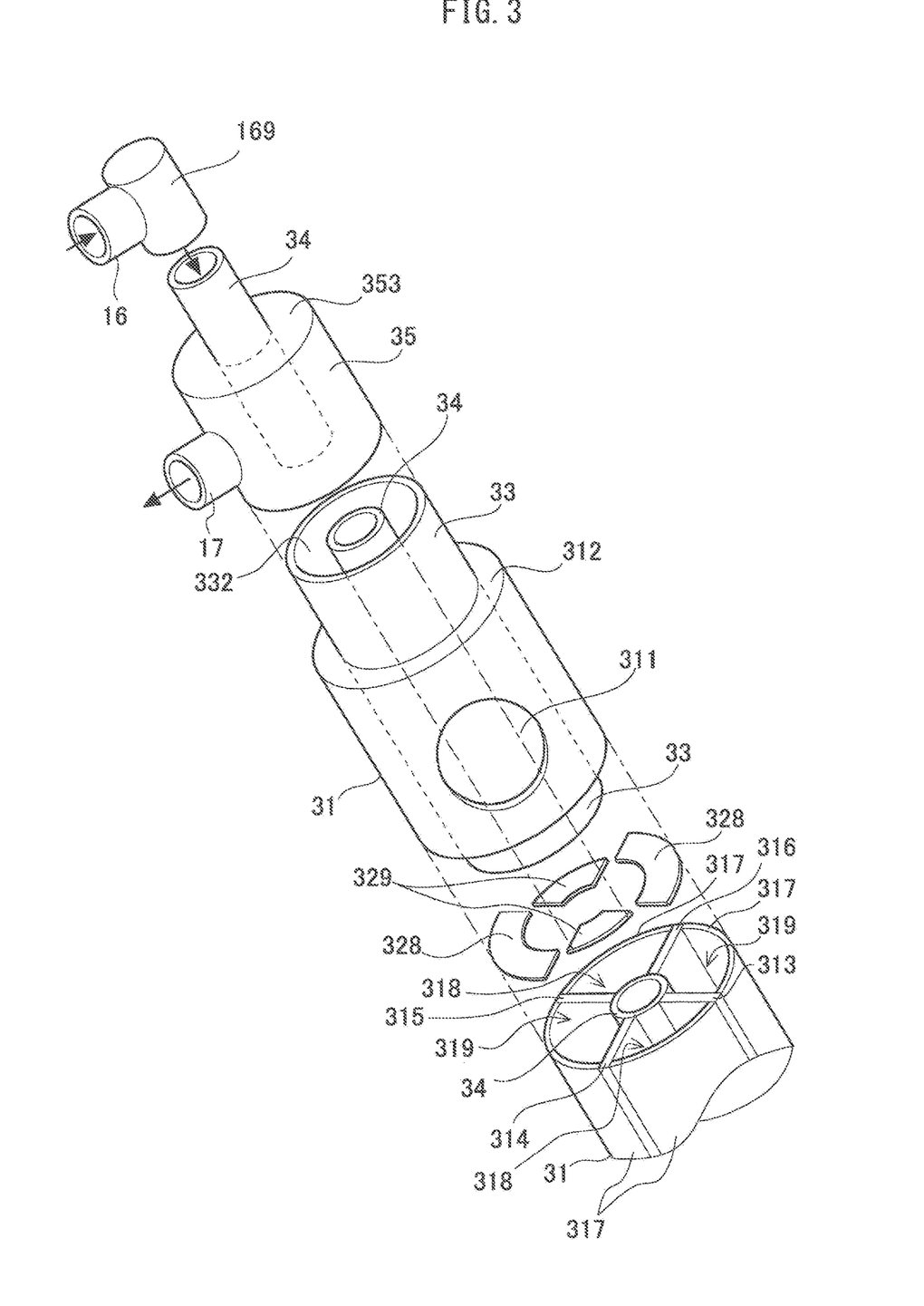
FIG. 3 is an exploded perspective view illustrating a part of the shaft.

Next, the configurations of the units are explained in detail. FIGS. 2A to 2C are diagrams illustrating the configuration of the shaft 3. FIG. 2A is a front view of the shaft 3, FIG. 2B is a side view, and FIG. 2C is an A-A sectional view. FIG. 3 is an exploded perspective view illustrating a part of the shaft 3.

As illustrated in FIGS. 2A to 2B and FIG. 3, the shaft 3 includes a supply tube 34 for the cooling water, which is a channel of the refrigerant, in the center. An upper shaft 33 is externally fit in the supply tube 34. A space between the outer circumferential surface of the supply tube 34 and the inner circumferential surface of the upper shaft 33 is set as a return tube 332 for the cooling water, which is a channel of the refrigerant.

A lower shaft 31 is connected below the upper shaft 33. The lower shaft 31 includes the supply tube 34 in the center and includes an outer hull 317 concentrically with the supply tube 34. The space between the outer circumferential surface of the supply tube 34 and the inner circumferential surface of the outer hull 317 is vertically divided into four. In other words, in a cross section orthogonal to the rotation axis, in the lower shaft 31, the space between the outer circumferential surface of the supply tube 34 and the inner circumferential surface of the outer hull 317 is divided into four by partition plates 313 to 316. In the shaft of the first embodiment, among the four divided spaces, a pair of spaces present in point-symmetrical positions centering on the supply tube 34 is set as a return tube 319 for the cooling water, which is a channel of the refrigerant. Another pair of spaces is set as an oxidizer supply path 318.

At the upper end portion of the lower shaft 31, portions of the return tubes 319/319 further on the outer side than the upper shaft 33 are closed by lids 328/328. Portions of the oxidizer supply paths 318/318 further on the inner side than the upper shaft 33 are closed by lids 329/329. That is, the return tube 332 of the upper shaft 33 is communicated with the return tube 319 in a region of the lower shaft 31 where the lids 329/329 are not provided. Note that the outer hull 317 of the lower shaft 31 has a configuration in which a circular tube is vertically divided into four and respectively connected among the partition plates 313 to 316. These outer hulls 317 are extended to above the lower end of the upper shaft 33 and foam spaces between the outer hulls 317 and the outer surface of the upper shaft 33. The upper ends of the outer hulls 317 are closed by a lid 312. Among the spaces, in upper parts of the outer hulls 317 facing the oxidizer supply path 318 sandwiched by the partition plates 314 and 315 and the oxidizer supply path 318 sandwiched by the partition plates 316 and 313, holes 311 piercing through the outer circumferential surface and the inner circumferential surface are provided. The holes 311 functioning as supply ports for the oxidizer are communicated with the oxidizer supply paths 318/318 in a region where the lids 329/329 of the lower shaft 31 are not provided.

On the other hand, in an upper part of the shaft 3, a cap-like connecting unit 169 is connected to the upper end portion of the supply tube 34. The supply tube 34 is rotatable with respect to the connecting unit 169. The connecting unit 169 and the supply tube 34 are kept watertight by a not-illustrated seal or the like. Cooling water from a not-illustrated cold heat source is supplied to the connecting unit 169 via a supply tube 16. The connecting unit 169 supplies the cooling water to the supply tube 34 of the shaft 3.

Like the upper shaft 33, a connecting tube 35 externally fits in the supply tube 34. The lower end of the connecting tube 35 is butted against the upper end of the upper shaft 33. The upper shaft 33 is rotatably connected to the connecting tube 35. The supply tube 34 is also rotatable with respect to the connecting tube 35. Further, the supply tube 34 and the connecting tube 35 are kept watertight and the upper shaft 33 and the connecting tube 35 are kept watertight by not-illustrated seal mechanisms. The connecting tube 35 allows the cooling water, which has circulated in the upper scraper 23, the oxidizer supply tube 22, and the lower scraper 21, to flow back to the cold heat source side via a return tube 17. In this way, the shaft 3 is rotatably connected to the connecting unit 169 and the connecting tube 35. Therefore, even if the shaft 3 is driven to rotate, the shaft 3 can circulate the refrigerant to the supply tube 34 and the return tubes 319, 332 functioning as channels of the refrigerant.

As illustrated in FIG. 1 and FIGS. 2A to 2B, the connecting unit 63 of the oxidizer supplying unit 6 is provided to cover the periphery of the holes 311 of the lower shaft 31. When the oxidizer is sent into the connecting unit 63 from the blower 61 via the duct 62, the oxidizer is supplied to the oxidizer supply path 318 via the holes 311/311. The shaft 3 is rotatably connected to the connecting unit 63. Therefore, even if the shaft 3 is driven to rotate, the shaft 3 can supply the oxidizer to the oxidizer supply path 318.

Next, the oxidizer supply tube 22 is explained with reference to FIG. 1 to FIG. 5B. As illustrated in FIG. 2C, in the oxidizer supply tube 22, a plurality of oxidizer supply tubes 22 are radially provided at equal intervals from adjacent other oxidizer supply tubes 22 centering on the lower shaft 31. In an example of FIG. 2C, four oxidizer supply tubes 22 are radially provided. In other words, two oxidizer supply tubes 22 are provided on one straight line across the lower shaft 31. The other two oxidizer supply tubes 22 are provided on a straight line orthogonal to the straight line across the lower shaft 31.

Figure 4:
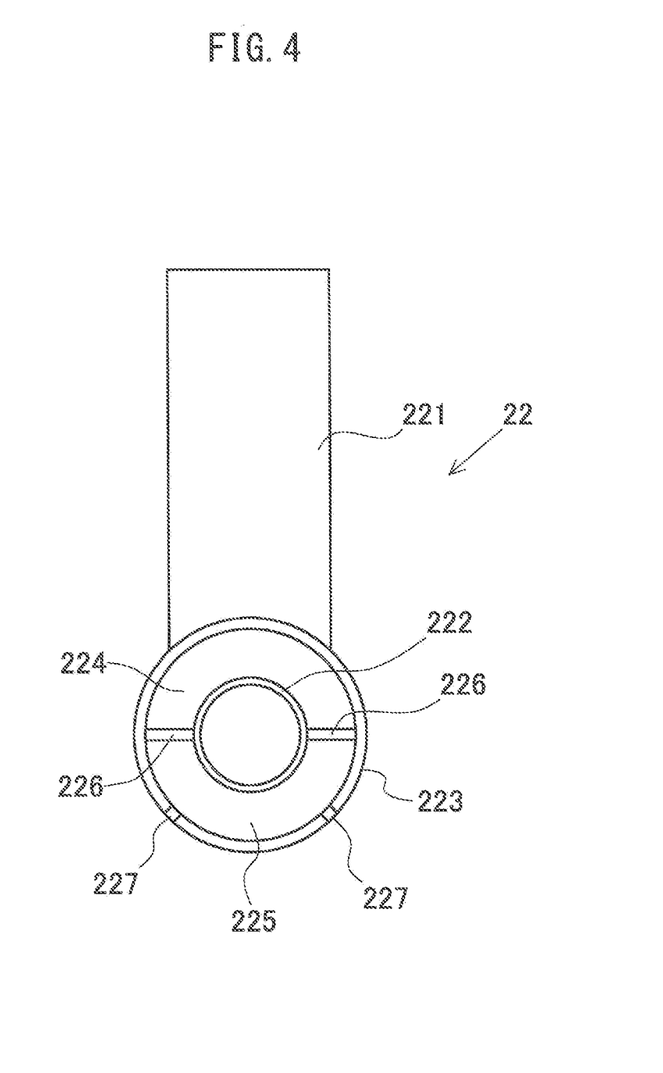
FIG. 4 is a sectional view of an oxidizer supply tube in a B line in FIG. 2A.

FIG. 4 is a sectional view of the oxidizer supply tube 22 in a B line illustrated in FIG. 2A. As illustrated in FIG. 4, the oxidizer supply tube 22 includes a supply tube 222 for the cooling water, which is a channel of the refrigerant, in the center and includes an outer tube 223, the cross section of which is concentric with the supply tube 222. Note that the proximal end portion of the oxidizer supply tube 22 is connected to the shaft 3. The distal end portion of the oxidizer supply tube 22 is closed by a not-illustrated lid.

In the oxidizer supply tube 22, a space between the outer circumferential surface of the supply tube 222 and the inner circumferential surface of the outer tube 223 is vertically divided into two by the partition plate 226. In the oxidizer supply tube 22 of the first embodiment, an upper space of the two divided spaces is set as a return tube 224 for the refrigerant. A lower space is set as an oxidizer channel 225. The outer tube 223 forming the oxidizer channel includes an oxidizer supply port 227 opened in an outer surface in contact with the raw material in a predetermined position in the longitudinal direction and communicating with the oxidizer channel 225 on the inside. The oxidizer supply tube 22 of the first embodiment includes two oxidizer supply ports 227 in each of nine places set at substantially equal intervals in the longitudinal direction. In this way, the oxidizer supply tube 22 supplies the oxidizer from each of a plurality of oxidizer supply ports 227 provided in the longitudinal direction.

The supply tube 222 is connected to the return tube 224 near the distal end of the oxidizer supply tube 22. The refrigerant supplied to the distal end portion by the supply tube 222 turns back to the return tube 224 and flows back to the return tube 319 in the lower shaft 31.

Note that, in an upper part of each of the oxidizer supply tubes 22, two flat impellers 221 are erected at a predetermined interval in the longitudinal direction of the oxidizer supply tube 22. A position of the impellers 221 in the longitudinal direction of the oxidizer supply tube 22 is different for each of the oxidizer supply tubes 22. Therefore, the impellers 221 of the each of the oxidizer supply tubes 22 can agitate different positions in the longitudinal direction. Therefore, the inside of the storing unit 19 can be entirely agitated.

Figure 5A:
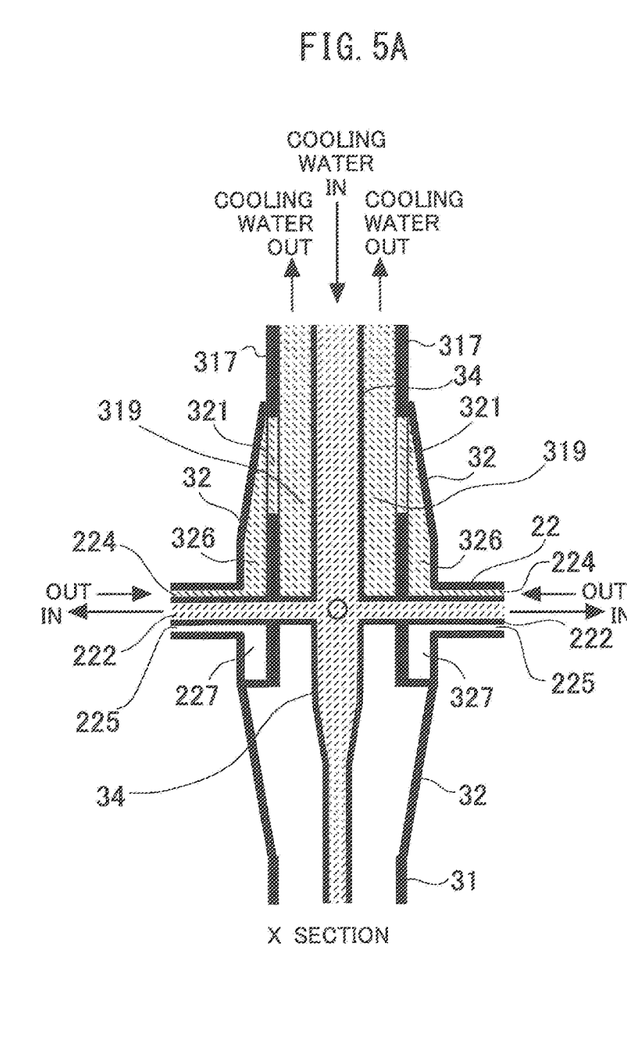
FIG. 5A is a diagram illustrating a cross section passing a rotation center in parallel to a front surface illustrated in FIG. 2A.
Figure 5B:
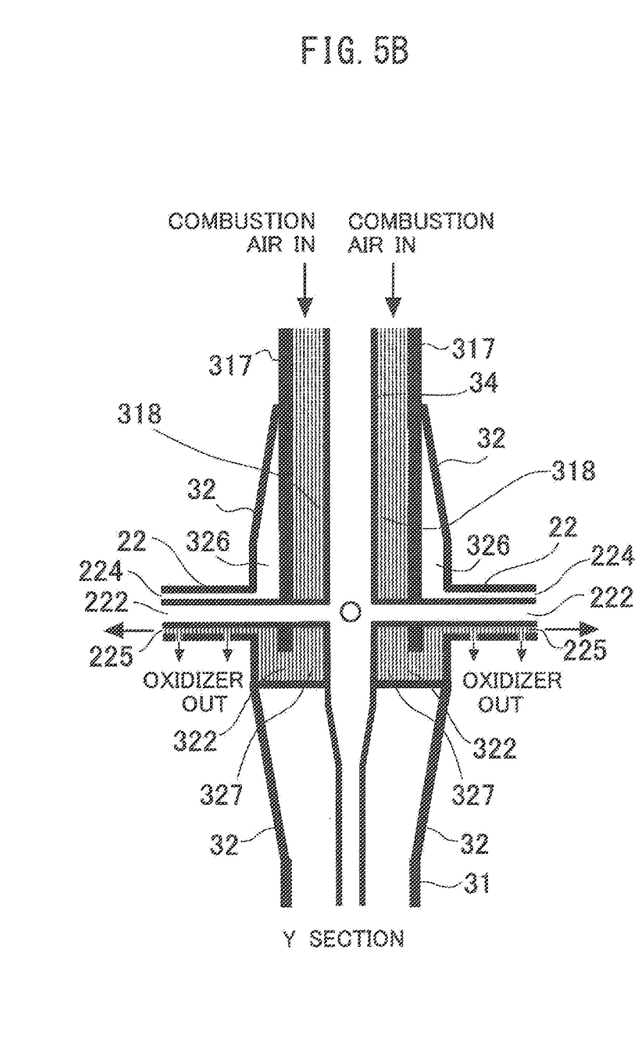
FIG. 5B is a diagram illustrating a cross section passing the rotation center in parallel to a side surface illustrated in FIG. 2B.

FIG. 5A is a diagram illustrating a cross section passing a rotation center in parallel to a front surface illustrated in FIG. 2A. FIG. 5B is a diagram illustrating a cross section passing the rotation center in parallel to a side surface illustrated in FIG. 2B. As illustrated in FIG. 5A and FIG. 5B, the supply tube 34 of the lower shaft 31 and the supply tubes 222 of the each of the oxidizer supply tubes 22 are connected. An outer ring member 32 is provided around a connecting portion of the lower shaft 31 and the oxidizer supply tube 22. A space is formed between the outer surface of the lower shaft 31 and the inner surface of the outer ring member 32. The space is partitioned by a not-illustrated partition plate into an upper space 326 communicating with the return tube 224 for the refrigerant of the oxidizer supply tube 22 and a lower space 327 communicating with the oxidizer channel 225 of the oxidizer supply tube 22.

As illustrated in FIG. 5A, in the outer hull 317 of the lower shaft 31, a communication hole 321 that communicates between the return tube 319 for the cooling water and the upper space 326 located on the outer side of the return tube 319 is provided. Further, the upper space 326 communicates with the return tube 224 of the refrigerant of the oxidizer supply tube 22.

With these configurations, the refrigerant sent from the supply tube 34 of the lower shaft 31 to the distal end portions of the each of the oxidizer supply tubes 22 via the supply tubes 222 of the each of the oxidizer supply tubes 22 turns back to the return tube 224 at the distal end portions of the each of the oxidizer supply tubes 22. The refrigerant returning to the return tube 224 of the oxidizer supply tube 22 flows back to the return tube 319 of the lower shaft 31 via the upper space 326 and the communication hole 321 of the outer hull 317.

As illustrated in FIG. 5B, in the outer hull 317 of the lower shaft 31, a communication hole 322 that communicates between the oxidizer supply path 318 and the lower space 327 in the outer ring member 32 is provided. Further, the lower space 327 communicates with the oxidizer channel 225 of the oxidizer supply tube 22.

With these configurations, the air serving as the oxidizer supplied to the oxidizer supply path 318 of the lower shaft 31 is supplied to the lower space 327 via the communication hole 322. The air serving as the oxidizer is sent from the lower space 327 to the oxidizer channel 225 of the oxidizer supply tube 22 and supplied to the raw material from the oxidizer supply port 227 provided in the oxidizer channel 225. Note that, in FIG. 5B, the return tube 224 of the refrigerant communicates with the upper space 326. The refrigerant turning back to the return tube 224 of the refrigerant is introduced into the upper space 326. Because the upper space is connected in the circumferential direction, the refrigerant in the upper space 326 flows back to the refrigerant channel 319 of the lower shaft 31 via the communication hole 321 illustrated in FIG. 5A. In FIG. 5A as well, the oxidizer channel 225 of the oxidizer supply tube 22 communicates with the lower space 327. Because the lower space is connected in the circumferential direction, the oxidizer introduced into the lower space 327 via the communication hole 322 illustrated in FIG. 5B is sent from the lower space 327 illustrated in FIG. 5A to the oxidizer channel 225 of the oxidizer supply tube 22.

Figure 6:
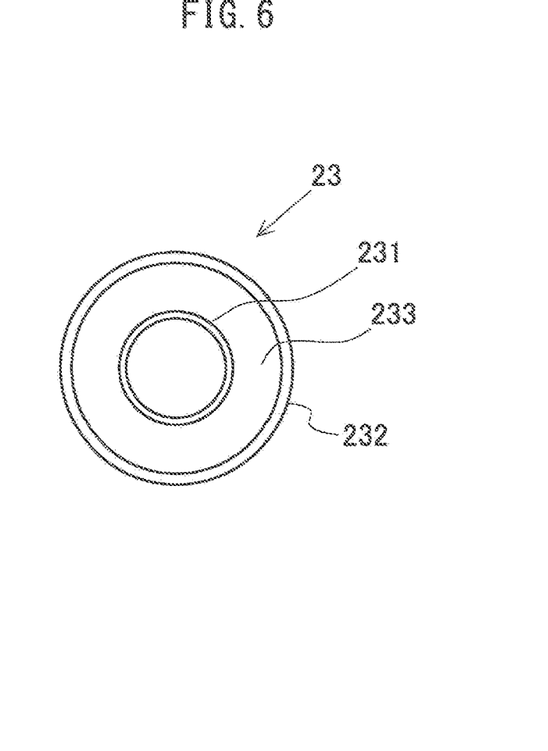
FIG. 6 is a sectional view of an upper scraper in a D line in FIG. 2A.

Next, the configuration of the upper scraper 23 is explained with reference to FIG. 6 and FIG. 7. FIG. 6 is a sectional view of the upper scraper 23 in a D line in FIG. 2A. As illustrated in FIG. 6, the upper scraper 23 includes a supply tube 231 for the cooling water, which is a channel of the refrigerant, in the center and includes an outer tube 232 concentrically with the supply tube 231 in a cross section of FIG. 6. In the upper scraper 23, a space between the outer circumferential surface of the supply tube 231 and the inner circumferential surface of the outer tube 232 is set as a return tube 233 for the refrigerant. The supply tube 231 is opened near the distal end of the upper scraper 23 and connected to the return tube 233. The proximal end portion of the upper scraper 23 is connected to the shaft 3. The distal end portion of the upper scraper 23 is closed by a not-illustrated lid.

Figure 7:
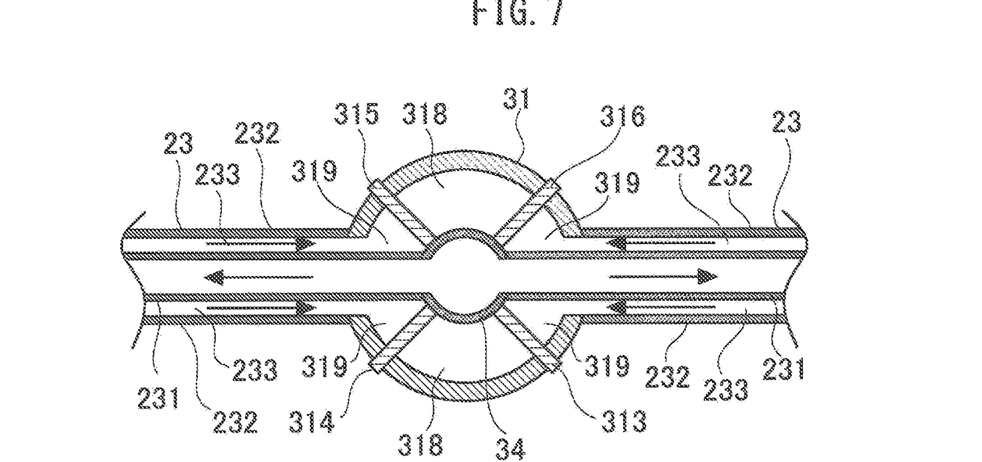
FIG. 7 is a sectional view in a C line in FIG. 2A.

FIG. 7 is a sectional view in a C line in FIG. 2A. The refrigerant supplied from the supply tube 34 in the lower shaft 31 to the supply tube 231 of the upper scraper 23 is sent to the distal end portion of the upper scraper 23 by the supply tube 231, turns back to the return tube 233, and flows back to the return tube 319 in the lower shaft 31. The refrigerant circulates in the supply tube 231 and the return tube 233 in this way, whereby the upper scraper 23 is cooled.

Figure 8:
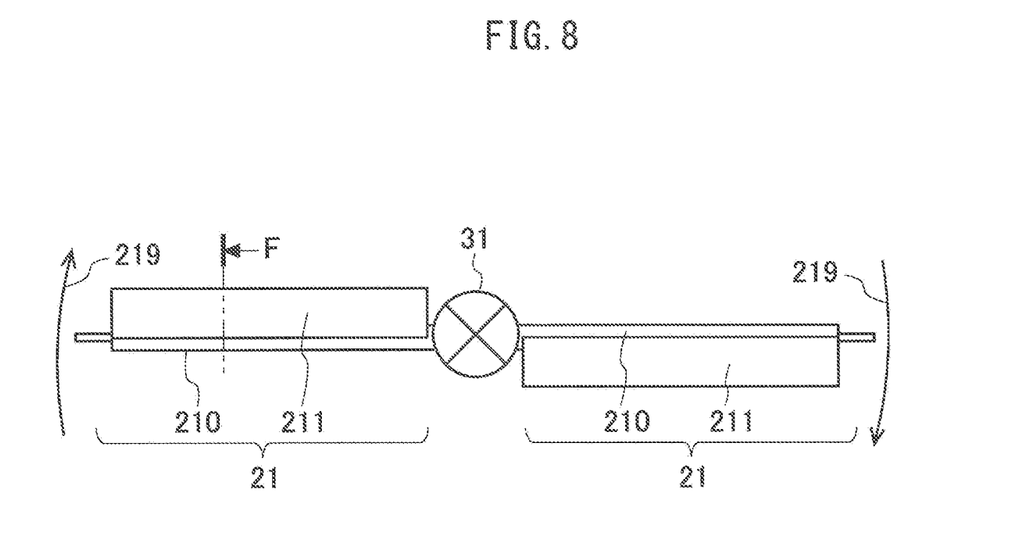
FIG. 8 is a sectional view in an E line in FIG. 2A.
Figure 9:
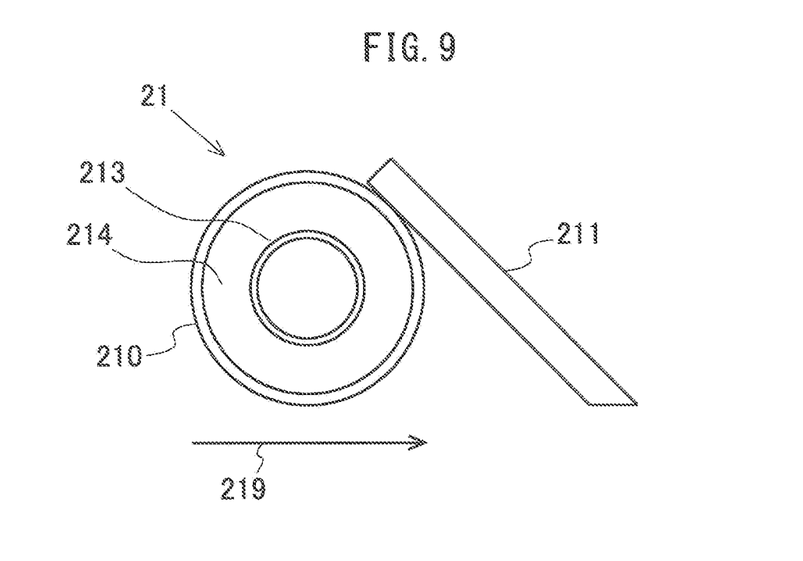
FIG. 9 is a sectional view of a lower scraper in an F line in FIG. 8.

Next, the configuration of the lower scraper 21 is explained with reference to FIG. 8 and FIG. 9. FIG. 8 is a sectional view in an E line in FIG. 2A. FIG. 9 is a sectional view of the lower scraper 21 in an F line in FIG. 8. As illustrated in FIG. 8, two lower scrapers 21 are provided on one straight line across the lower shaft 31. The lower scraper 21 is not limited to this. Three or more lower scrapers 21 may be radially provided centering on the lower shaft 31.

The lower scraper 21 includes a supply tube 213 for the cooling water, which is a channel of the refrigerant, in the center and includes an outer tube 210 concentrically with the supply tube 213 in a cross section of FIG. 9. In the lower scraper 21, a space between the outer circumferential surface of the supply tube 213 and the inner circumferential surface of the outer tube 210 is set as the return tube 214 for the refrigerant. The supply tube 213 is opened near the distal end of the lower scraper 21 and connected to the return tube 214. The proximal end portion of the lower scraper 21 is connected to the lower shaft 31. The distal end portion of the lower scraper 21 is closed by a not-illustrated lid. Note that, in the lower scraper 21, as in the upper scraper 23 illustrated in FIG. 7, the supply tube 213 is connected to the supply tube 34 of the lower shaft 31. The return tube 214 is connected to the return tube 319 of the lower shaft 31. The refrigerant supplied from the supply tube 34 in the lower shaft 31 to the supply tube 213 of the lower scraper 21 is sent to the distal end portion of the lower scraper 21 by the supply tube 213, turns back to the return tube 214, and flows back to the return tube 319 in the lower shaft 31. The refrigerant circulates in the supply tube 213 and the return tube 214 in this way, whereby the lower scraper 21 is cooled.

The lower scraper 21 rotates in an arrow 219 direction, that is, a clockwise direction in FIG. 8 according to the rotation of the lower shaft 31. The lower scraper 21 includes a flat pressing plate 211 on the front side of the outer tube 210 in this rotating direction. Note that the lower scraper 21 is provided in a position where the lower end of the pressing plate 211 or the lower end of the outer tube 210 is in contact with or contiguous to the upper surface of the punching plate 13. The lower scraper 21 provided in this position rotates and the pressing plate 211 agitates the raw material in a pushing-aside manner, whereby the raw material carbonized to be fine grains drops via the holes of the punching plate 13. Consequently, it is possible to exclude the carbonized raw material, replace the raw material on the punching plate 13, and continuously perform gasification.

Gasifying Method

When gasification is performed in the gasification furnace having the configuration explained above, first, the raw material is fed into the storing unit 19 by the raw-material feeding unit 4. At this time, the raw material is ignited by the electric heater 41 of the raw-material feeding unit 4. The raw material is fed into the storing unit 19 in an ignited state.

On the other hand, the not-illustrated cold heat source supplies the cooling water serving as the refrigerant to the shaft 3 via the supply tube 16 and circulates the cooling water in the shaft 3 to cool the shaft 3. Note that the cooling water after the circulation is discharged from the return tube 17. The cold heat source supplies the cooling water to the water cooling jacket 18 of the furnace body 1 via the refrigerant introducing unit 11 and circulates the cooling water in the water cooling jacket 18 to cool the water cooling jacket 18. Note that the cooling water after the circulation is discharged from the refrigerant discharging unit 15.

The driving unit 5 drives to rotate the shaft 3 according to driving of the motor 51. Consequently, the upper scraper 23, the oxidizer supply tube 22, and the lower scraper 21 connected to the shaft 3 also turns in the storing unit 19.

Further, the oxidizer supplying unit 6 delivers the air serving as the oxidizer with the blower 61 and supplies the air into the shaft 3 via the duct 62 and the connecting unit 63. The air supplied into the shaft 3 is supplied to the oxidizer supply tube 22 via the oxidizer supply path 318 and supplied from the oxidizer supply port 227 to the raw material via the oxidizer channel 225. When the air is supplied in a state in which the raw material is deposited in the storing unit 19 by a predetermined amount, fire spreads from the raw material ignited by the material feeding unit 4 to the entire raw material deposited in the storing unit 19. When the oxygen in the storing unit 19 is consumed, the storing unit 19 comes into a dry-distilled state. The oxidizer supplying unit 6 supplies an appropriate amount of the air to maintain the dry-distilled state.

Organic matter in the raw material is thermally decomposed and gasified by the dry-distillation. This gas is sucked out by driving of the blower 12 and supplied to the demand side via the pipe 14 as fuel gas.

Note that the lower scraper 21 performs agitation of the raw material on the punching plate 13 and discharges the raw material carbonized to be fine grain via the holes of the punching plate 13. That is, a space below the punching plate 13 functions as a suction chamber for the fuel gas and functions as a receiving unit for the raw material after the gasification.

The raw material is fed from the raw material feeding unit 4 to supplement the raw material reduced by the gasification and the discharge in this way. A specified amount of the raw material is maintained in the storing unit 19. For example, in the first embodiment, the height of the raw material deposited in the storing unit 19 is controlled to be height of a target. Note that this control may be performed by measuring a deposit amount of the raw material with a sensor or the like and controlling a feeding amount of the raw-material feeding unit 4 with a control device or may be performed by a person controlling the feeding amount by the raw-material feeding unit 4.

When the raw material is fixedly fed from the raw-material feeding unit 4, a pile of the raw material is formed in a part to which the raw material is fed, the height of the deposited material becomes nonuniform to deteriorate efficiency of gasification. Therefore, the gasification furnace includes the upper scraper 23 in a position adjusted to the height of the target to which the raw material is deposited. The upper scraper turns, whereby the pile of the fed raw material is smoothed, and the height of the raw material becomes uniform.

Effects

As explained above, according to the first embodiment, the oxidizer supply tube 22 supplies the oxidizer while turning in the storing unit 19. Therefore, it is possible to appropriately cause oxidation reaction in a wide range in the storing unit 19 and efficiently perform gasification.

The gasification furnace includes the upper scraper 23 in the position adjusted to the height of the target to which the raw material is deposited. Therefore, it is possible to level the height of the deposited raw material and appropriately perform gasification in a wide range covered by the turning of the upper scraper 23 in the storing unit 19.

Note that, in the first embodiment, the lower scraper 21, the oxidizer supply tube 22, and the upper scraper 23 are provided. However, the lower scraper 21 and the upper scraper 23 may be omitted. In this case, the oxidizer supply tube 22 may be used as the lower scraper 21 and the upper scraper 23. The height at which the oxidizer supply tube 22 is set may be optionally set. For example, the height at which the oxidizer supply tube 22 is set is set according to a reaction condition of the raw material, a shape of the storing unit, and the like.

Note that, in the first embodiment, the configuration is adopted in which the oxidizer is supplied from the oxidizer supply tube 22. However, a configuration may be adopted in which an oxidizer channel is included in the upper scraper 23 and the lower scraper 21 and the oxidizer is supplied from the upper scraper 23 and the lower scraper 21.

Modifications

In the first embodiment, the example is explained in which the gasification furnace includes the supply tube 34 in the center of the shaft 3 as illustrated in FIG. 3 and the space around the supply tube 34 is divided into four to form the oxidizer supply path 318 and the return tube 319. However, not only this, but configurations illustrated in FIG. 10A to FIG. 10F may be adopted.

Figures 10A, 10B:
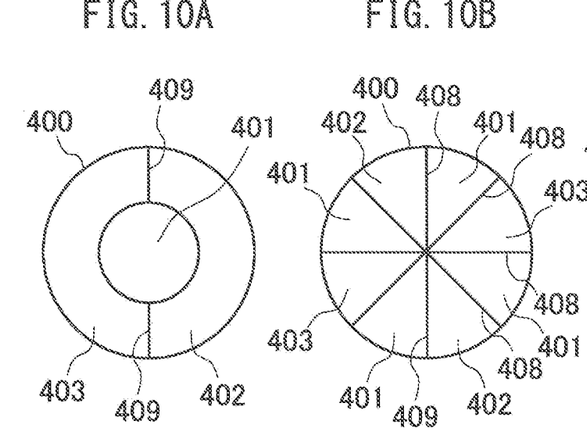
FIGS. 10A to 10F are diagrams illustrating a modification of the shaft.

In FIG. 10A, an oxidizer supply path 401 is set as a center, a space between the outer circumferential surface of the oxidizer supply path 401 and the inner circumferential surface of an outer tube 400 is divided into two by a partition plate 409, and one of the divided spaces is set as a supply tube 402 and the other is set as a return tube 403.

FIG. 10B is an example in which the inner space of the outer tube 400 is radially divided into eight by partition plates 408. Among the divided eight spaces, four spaces are set as the oxidizer supply paths 401, two spaces are set as the supply tubes 402, and the remaining two spaces are set as the return tubes 403.

Figure 10C:
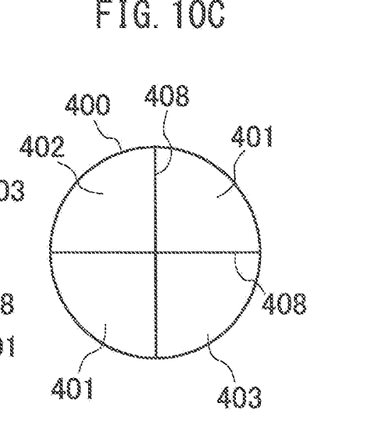

FIG. 10C is an example in which the inner space of the outer tube 400 is divided into four by the partition plates 408. Among the four divided spaces, two spaces are set as the oxidizer supply paths 401, one space is set as the supply tube 402, and the remaining one space is set as the return tube 403.

A sectional shape of the shaft is not limited to a circle and may be other shapes. For example, in FIGS. 10D to 10F, the sectional shape is a square.

Figure 10D:
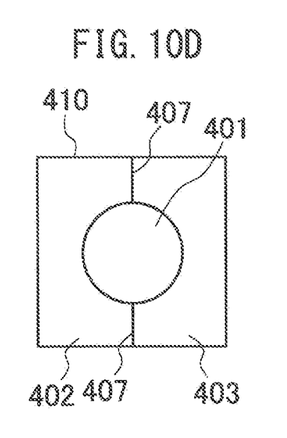

In FIG. 10D, the oxidizer supply path 401 is set as a center, a space between the outer circumferential surface of the oxidizer supply path 401 and the inner circumferential surface of an outer tube 410 is divided into two by a partition plate 407, and one of the divided spaces is set as the supply tube 402 and the other is set as the return tube 403.

Figure 10E:
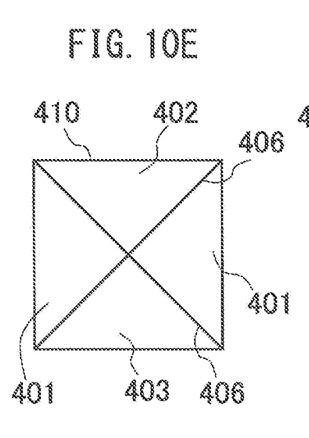

FIG. 10E is an example in which the inner space of the outer tube 410 is divided into four in a diagonal shape by partition plates 406. Among the four divided spaces, two spaces are set as the oxidizer supply paths 401, one space is set as the supply tube 402, and the remaining one space is set as the return tube 403.

Figure 10F:
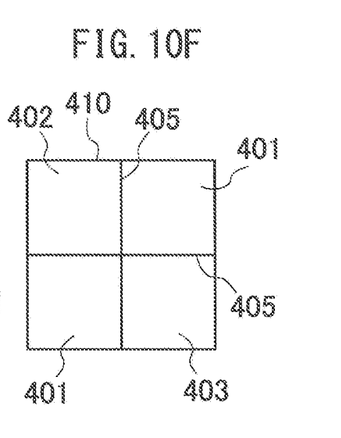

FIG. 10F is an example in which the inner space of the outer tube 410 is divided into four lengthwise and breadthwise by partition plates 405. Among the four divided spaces, two spaces are set as the oxidizer supply paths 401, one space is set as the supply tube 402, and the remaining one space is set as the return tube 403.

Note that the oxidizer supply paths 401, the supply tube 402, and the return tube 403 are desirably disposed point symmetrically around a rotation axis as illustrated in FIG. 10A to FIG. 10F.

Second Embodiment

Figure 11:
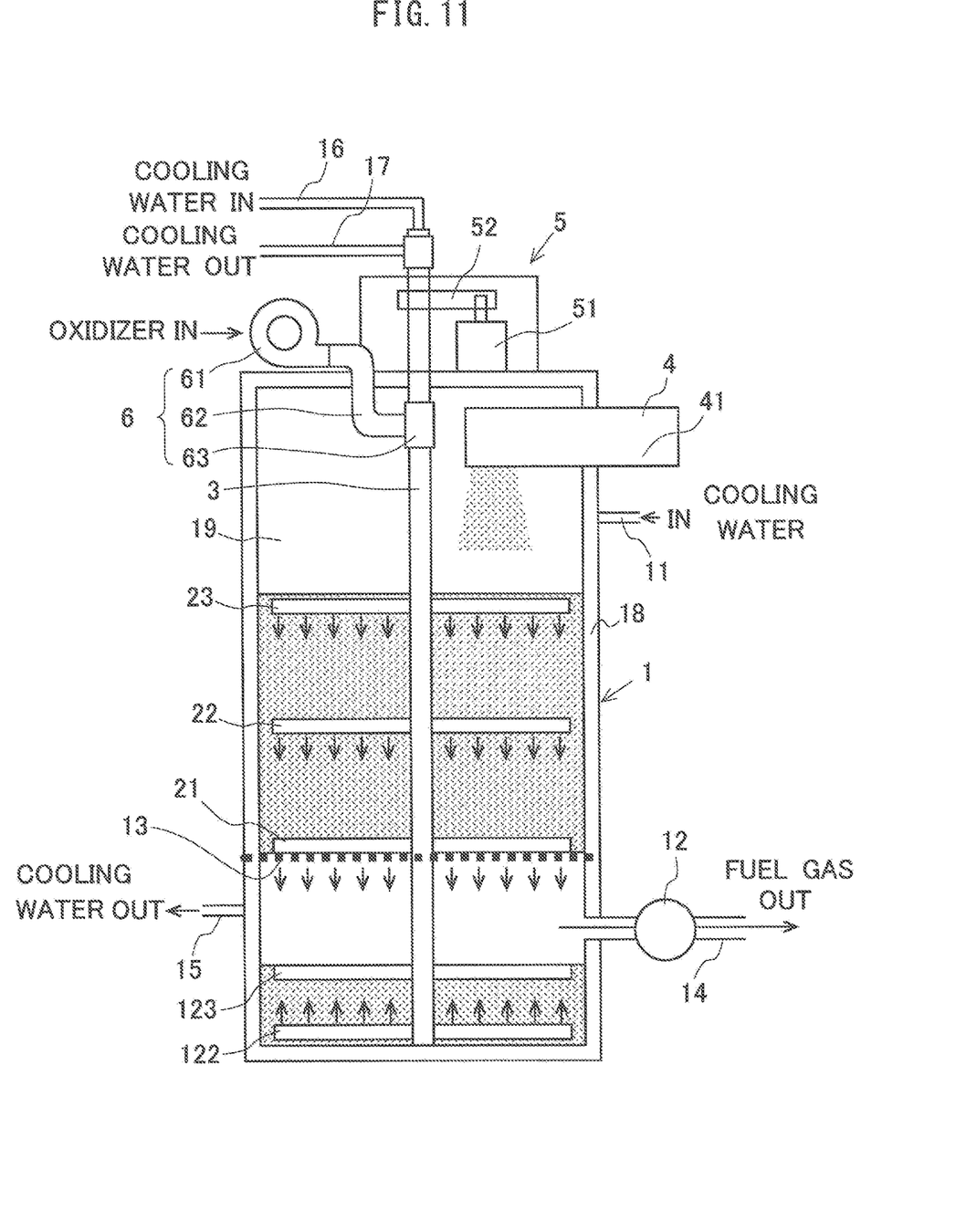
FIG. 11 is an explanatory diagram of a gasification furnace according to a second embodiment.

FIG. 11 is an explanatory diagram of a gasification furnace according to a second embodiment. The gasification furnace of the second embodiment is different from the first embodiment in a configuration including a second gasification chamber below the punching plate 13. The other components are the same. Therefore, the same elements are, for example, denoted by the same reference numerals and signs, and repeated explanation of the elements is omitted.

In the second embodiment, as illustrated in FIG. 11, a region above the punching plate 13 in the storing unit 19 is the first gasification chamber and a region below the punching plate 13 is the second gasification chamber.

In the second embodiment, the shaft 3 is extended to the second gasification chamber below the punching plate 13. The second gasification chamber includes an upper scraper 123 and an oxidizer supply tube 122. Note that the upper scraper 123 has the same configuration as the upper scraper 23. The oxidizer supply tube 122 has the same configuration as the oxidizer supply tube 22. Therefore, explanation of detailed configurations is omitted.

The gasification furnace of the second embodiment includes the second gasification chamber below the punching plate 13, therefore a raw material carbonized in the first gasification chamber (hereinafter simply referred to as carbide as well) drops from the holes of the punching plate 13 and is deposited in the second gasification chamber. Gas such as CO and the like is generated by dry-distilling the carbide deposited in the second gasification chamber while supplying the air serving as an oxidizer.

In this way, according to the second embodiment, it is possible to perform further gasification reusing the carbide discharged from the first gasification chamber and improve efficiency of the gasification.

Note that, in the second embodiment, the oxidizer supply tube 122 and the upper scraper 123 are provided. However, the upper scraper 123 may be omitted. The gasification furnace may include a lower scraper in addition to the oxidizer supply tube 122 and the upper scraper 123.

The configuration is adopted in which the oxidizer is supplied from the oxidizer supply tube 122 in the second gasification chamber. However, a configuration may be adopted in which an oxidizer channel is included in the upper scraper 123 and the lower scraper and the oxidizer is supplied from the upper scraper 123 and the lower scraper.

Third Embodiment

Figure 12:
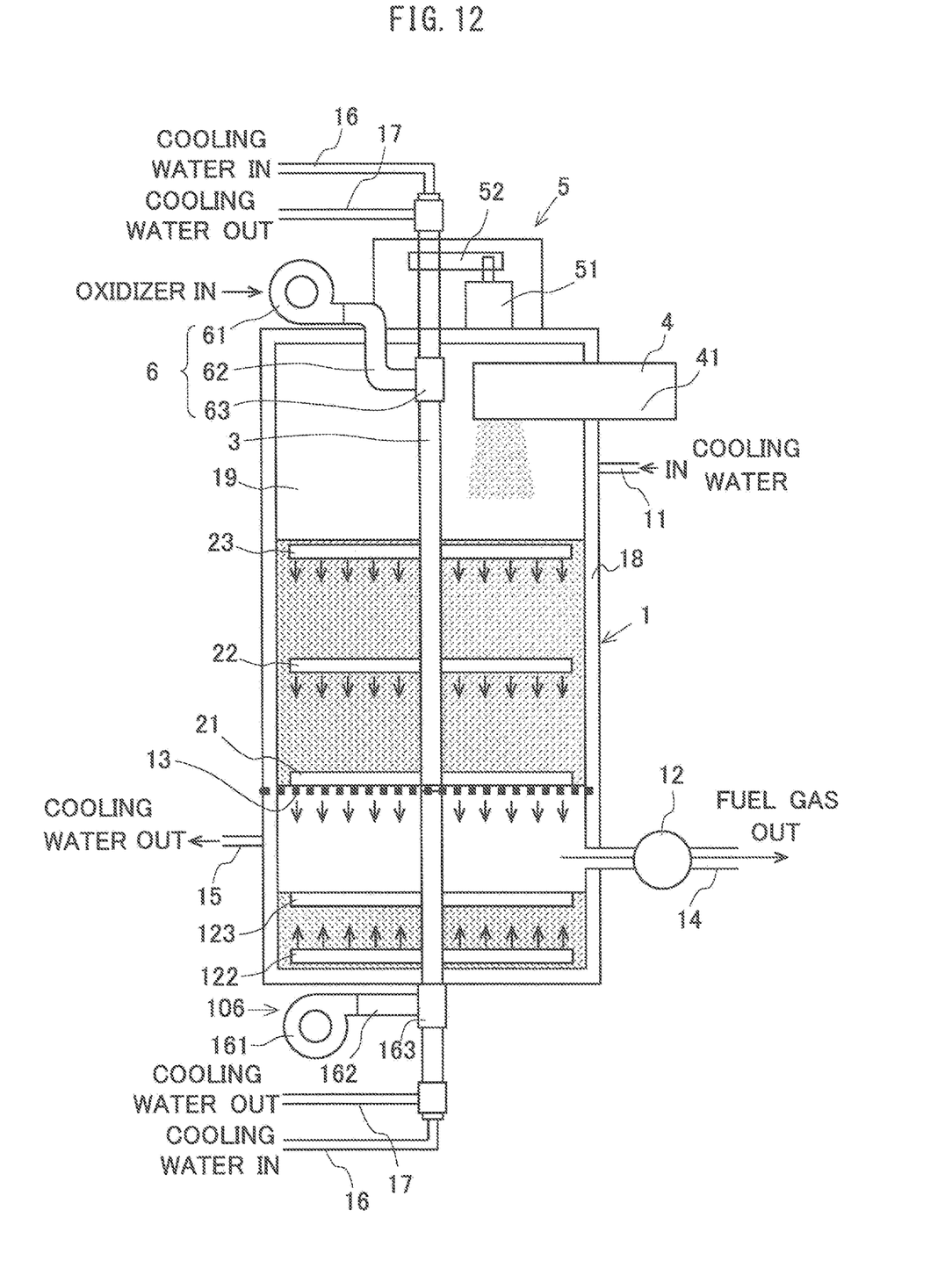
FIG. 12 is an explanatory diagram of a gasification furnace according to a third embodiment.

FIG. 12 is an explanatory diagram of a gasification furnace according to a third embodiment. The gasification furnace of the third embodiment is different from the second embodiment in a configuration in which channels of refrigerant and oxidizer supply paths are independent in a first gasification chamber and a second gasification chamber. The other components are the same. Therefore, the same elements are, for example, denoted by the same reference numerals and signs, and repeated explanation of the elements is omitted.

In the third embodiment, as illustrated in FIG. 12, a region above the punching plate 13 in the storing unit 19 is the first gasification chamber and a region below the punching plate 13 is the second gasification chamber.

In the third embodiment, a configuration is adopted in which a channel of refrigerant and an oxidizer supply path of the second gasification chamber is differentiated from a channel of refrigerant and an oxidizer supply path of the first gasification chamber and an oxidizer and cooling water for the second gasification chamber are supplied from the lower end of the shaft 3. As illustrated in FIG. 12, an oxidizer supplying unit 106 blows the air for the second gasification chamber with a blower 161, supplies the air to the oxidizer supply tube 122 via a duct 162, a coupling tube 163, and the shaft 3, and supplies the air from the oxidizer supply tube 122 to a carbide.

In this way, according to the third embodiment, the channel of the refrigerant and the oxidizer supply path of the second gasification chamber are differentiated from the channel of the refrigerant and the oxidizer supply path of the first gasification chamber. Therefore, supply conditions for the refrigerant and the oxidizer can be appropriately set respectively for the first gasification chamber and the second gasification chamber.

Fourth Embodiment

Figure 13:
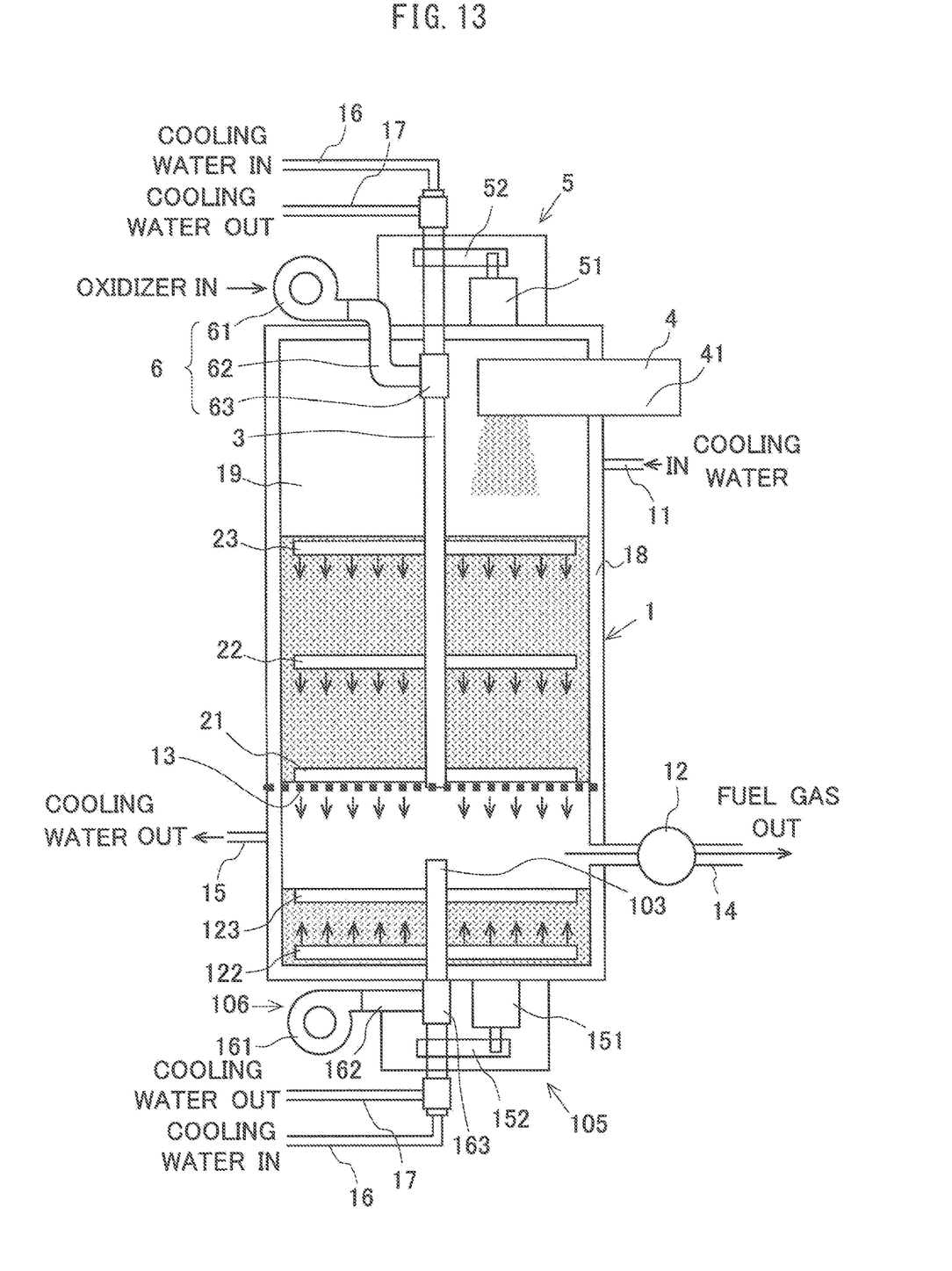
FIG. 13 is an explanatory diagram of a gasification furnace according to a fourth embodiment.

FIG. 13 is an explanatory diagram of a gasification furnace according to a fourth embodiment. The gasification furnace of the fourth embodiment is different from the third embodiment in a configuration in which shafts are independent in a first gasification chamber and a second gasification chamber. The other components are the same. Therefore, the same elements are, for example, denoted by the same reference numerals and signs, and repeated explanation of the elements is omitted.

In the fourth embodiment, as illustrated in FIG. 13, a shaft 103 is provided in the second gasification chamber separately from the shaft 3 of the first gasification chamber. The upper scraper 123 and the oxidizer supply tube 122 are connected to the shaft 103. A driving unit 105 includes an electric motor 151 functioning as a driving source and a coupling mechanism 152 such as a gear that transmits a driving force of the electric motor 151 to the shaft 103. The driving unit 105 drives to rotate the shaft 103 with the vertical direction set as a rotation axis.

In this way, according to the fourth embodiment, the shaft 103 of the second gasification chamber is provided separately from the shaft 103 of the first gasification chamber. Therefore, the first gasification chamber and the second gasification chamber can be easily separated. Maintainability is improved. Rotation conditions such as rotating speed of the shafts and timing for starting rotation can be appropriately set respectively in the first gasification chamber and the second gasification chamber.

The invention claimed is:

1. A gasification furnace comprising:
   a furnace body including a cylindrical storing unit that stores a biomass resource;
   an oxidizer supplying unit that supplies an oxidizer into the furnace body;
   a shaft extended in a vertical direction in the storing unit and including an oxidizer supply path through which the oxidizer is passed, a refrigerant supply path that supplies a refrigerant, and a refrigerant return path that recirculates the refrigerant;
   a plurality of oxidizer supply tubes, which are tubular members radially projecting from the shaft toward an inner wall of the storing unit, the plurality of oxidizer supply tubes including an oxidizer channel that communicates between a supply port for the oxidizer opened in an outer surface in contact with the biomass resource in the storing unit and the oxidizer supply path of the shaft, a supply tube that communicates with the refrigerant supply path of the shaft and sends the refrigerant from the proximal end to the distal end along the longitudinal direction of the tubular member in parallel with the oxidizer channel, and a return tube that communicates with the distal end of the supply tube and recirculates the refrigerant to the refrigerant return path of the shaft in parallel with the oxidizer channel; and
   a driving unit that rotates the shaft with the vertical direction in the storing unit set as a rotation axis to thereby turn the oxidizer supply tube in the storing unit,
   wherein the shaft includes a supply tube communication space that communicates the refrigerant supply path of the shaft and the supply tubes of the plurality of oxidizer supply tubes, and a return tube communication space that communicates with the refrigerant return path of the shaft and the return tubes of the plurality of oxidizer supply tubes.

2. The gasification furnace according to claim 1, further comprising an upper scraper that projects from the shaft toward the inner wall of the storing unit at a height adjusted to a target in a case in which the biomass resource is fed from an upper part of the storing unit and deposited to a height of the target.

3. The gasification furnace according to claim 1, further comprising:
   a partitioning unit that vertically partitions the storing unit and includes a plurality of openings piercing through the storing unit in an up-down direction; and
   a lower scraper that projects from the shaft toward the inner wall of the storing unit in a state in which the lower scraper is in contact with an upper surface of the partitioning unit or a state in which the lower scraper is contiguous to the upper surface.

4. The gasification furnace according to claim 1, further comprising a partitioning unit that vertically partitions the storing unit and includes a plurality of openings piercing through the storing unit in an up-down direction, wherein
   the storing unit above the partitioning unit is set as a first gasification chamber, and a second gasification chamber is included in the storing unit below the partitioning unit.

5. The gasification furnace according to claim 4, wherein the shaft and the plurality of oxidizer supply tubes are provided in each of the first gasification chamber and the second gasification chamber.

6. The gasification furnace according to claim 4, wherein the shaft is provided across the first gasification chamber and the second gasification chamber, and the plurality of oxidizer supply tubes is provided in each of the first gasification chamber and the second gasification chamber.

7. The gasification furnace according to claim 6, wherein the shaft includes a first oxidizer supply path for supplying the oxidizer from an upper part to at least one of the plurality of oxidizer supply tubes in the first gasification chamber and a second oxidizer supply path for supplying the oxidizer from a lower part to at least one of the oxidizer supply tubes in the second gasification chamber.

8. The gasification furnace according to claim 4, further comprising a lower scraper that projects from the shaft toward the inner wall of the storing unit in a state in which the lower scraper is in contact with an upper surface of the partitioning unit or a state in which the lower scraper is contiguous to the upper surface.

* * * * *